United States Patent [19]
Abe

[11] Patent Number: 6,073,730
[45] Date of Patent: Jun. 13, 2000

[54] BICYCLE SWITCH AND BRACKET COVER THEREFOR

[75] Inventor: Takeo Abe, Sakai, Japan

[73] Assignee: Shimano, Inc., Osaka, Japan

[21] Appl. No.: 09/058,042

[22] Filed: Apr. 9, 1998

[30] Foreign Application Priority Data

May 16, 1997 [JP] Japan ................................. 9-141113

[51] Int. Cl.[7] .............................. B62L 1/00; G05G 11/00; B62J 3/00
[52] U.S. Cl. ........................ 188/24.11; 74/489; 340/432
[58] Field of Search ................................. 340/432, 456; 74/489, 502.2; 474/78; 188/2 D, 24.11, 24.15, 24.22

[56] References Cited

U.S. PATENT DOCUMENTS

| | | | |
|---|---|---|---|
| 4,071,892 | 1/1978 | Genzling | 364/424 |
| 5,621,382 | 4/1997 | Yamamoto | 340/432 |
| 5,625,336 | 4/1997 | Yamamoto | 340/432 |
| 5,632,226 | 5/1997 | Huang et al. | 116/295 |
| 5,653,649 | 8/1997 | Watarai | 474/78 |
| 5,660,083 | 8/1997 | Huang et al. | 74/502.2 |
| 5,676,021 | 10/1997 | Campagnolo | 74/489 |
| 5,682,794 | 11/1997 | Shibata | 74/489 |
| 5,701,786 | 12/1997 | Kawakami | 74/502.2 |
| 5,900,705 | 5/1999 | Kimura | 318/286 |
| 5,903,214 | 5/1999 | Watarai | 340/432 |

FOREIGN PATENT DOCUMENTS

504118 A1  9/1992  European Pat. Off. .

*Primary Examiner*—Chris Schwartz
*Attorney, Agent, or Firm*—James A. Deland

[57] ABSTRACT

A brake operating apparatus includes a brake member bracket for attachment to a handlebar, wherein the brake member bracket includes a concave inner surface defining a switch mounting recess. A brake member such as a brake lever is movably attached to the brake member bracket, and the switch mounting recess is structured for mounting an electrical switch therein. Since the switch is mounted within a recess in the brake member bracket, the switch does not project excessively from the brake member bracket. A flexible cover is disposed on the brake member bracket to cover the first and second push buttons. Since the push buttons project slightly from the brake member bracket, the flexible cover includes a first protrusion disposed over the first push button and a second protrusion disposed over the second push button. To help the rider distinguish between the two push buttons, the first protrusion is shaped differently from the second protrusion.

34 Claims, 8 Drawing Sheets

FIG. 8A
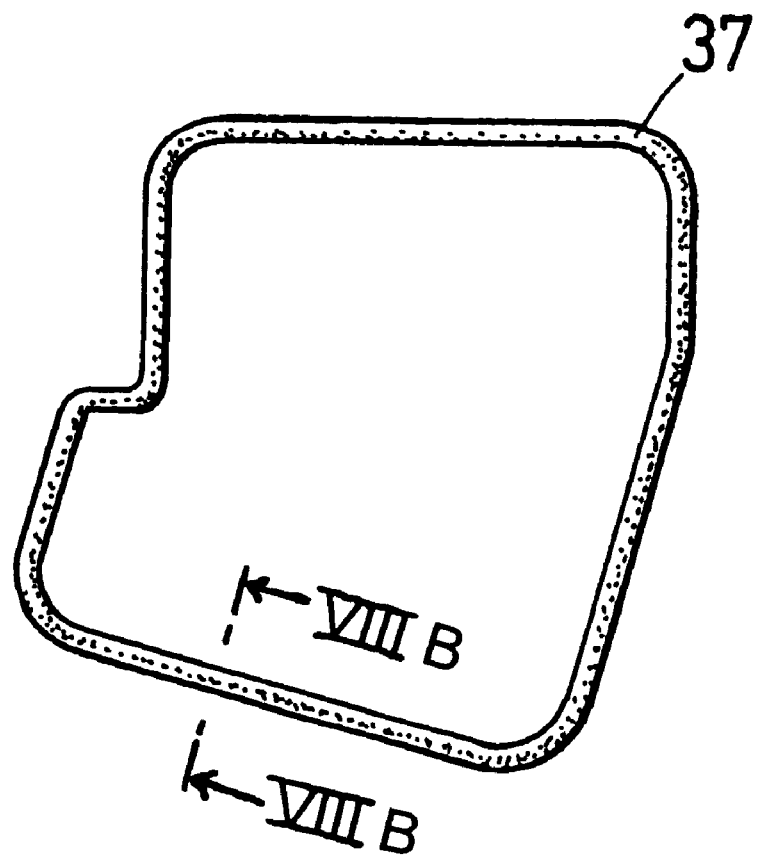
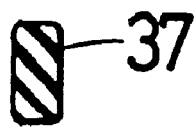
FIG. 8B

BICYCLE SWITCH AND BRACKET COVER THEREFOR

BACKGROUND OF THE INVENTION

The present invention is directed to control devices for bicycles and, more particularly, to an electrical switch used to operate an electrical bicycle device, wherein the electrical switch is mounted on a brake lever bracket.

Bicycles are often equipped with computers for measuring and displaying various parameters such as the travel speed of the bicycle, the torque applied to the bottom bracket axle, the rider's pulse rate and blood pressure, etc. The computer display is often detachably mounted on the bicycle, and mode and start switches are usually provided integrally with the display. The mode switch is used for switching among the types of parameters displayed, and the start switch is used to start and stop measurement of one or more of the displayed parameters.

In one known construction disclosed in U.S. Pat. No. 4,071,892, a display switch is disposed on the lever bracket to improve ease of operation. However, in this type of structure the switch projects substantially to the outside, so there is a risk of the switch occasionally hitting the ground and malfunctioning when the bicycle falls down. Also, because the push button of the switch is moved to operate the switch, foreign matter such as dust, rain, and condensed moisture can penetrate into the electric contacts of the switch through the gap between the push button and the switch mounting panel, thus; corroding the electric contacts or resulting in inadequate contact.

SUMMARY OF THE INVENTION

The present invention is directed to a bicycle control device wherein in electrical switch may be mounted to a brake lever bracket without projecting excessively from the brake lever bracket, and wherein the switches are protected from contamination. In one embodiment of the present invention, a brake operating apparatus includes a brake member bracket for attachment to a handlebar, wherein the brake member bracket includes a concave inner surface defining a switch mounting recess. A brake member such as a brake lever is movably attached to the brake member bracket, and the switch mounting recess is structured for mounting an electrical switch therein. Since the switch is mounted within a recess in the brake member bracket, the switch does not project excessively from the brake member bracket.

In a more specific embodiment, the electrical switch includes a printed circuit board, a first push button disposed on the printed circuit board for selectively operating an electrical circuit on the printed circuit board, and a second push button disposed on the printed circuit board for selectively operating the electrical circuit. If desired, the first push button may operate a mode switch for a bicycle computer and the second push button may operate a start switch for the bicycle computer. Also, the first and second push buttons may project in a direction of an axis of rotation of the brake member to minimize the chance that the first and second push buttons will be mistakenly operated while riding the bicycle.

To prevent contaminants from affecting the electronics, a flexible cover may be disposed on the brake member bracket to cover the first and second push buttons. Since the push buttons project slightly from the brake member bracket, the flexible cover may include a first protrusion disposed over the first push button and a second protrusion disposed over the second push button. To help the rider distinguish between the two push buttons, the first protrusion may be shaped differently from the second protrusion.

BRIEF DESCRIPTION OF THE DRAWINGS

FIG. 8(A) is a front view of the seal member shown in FIG. 3;

FIG. 8(B) is a view taken along line VIIIB—VIIIB in FIG. 8(A);

DETAILED DESCRIPTION OF THE EMBODIMENTS

Figure 1:
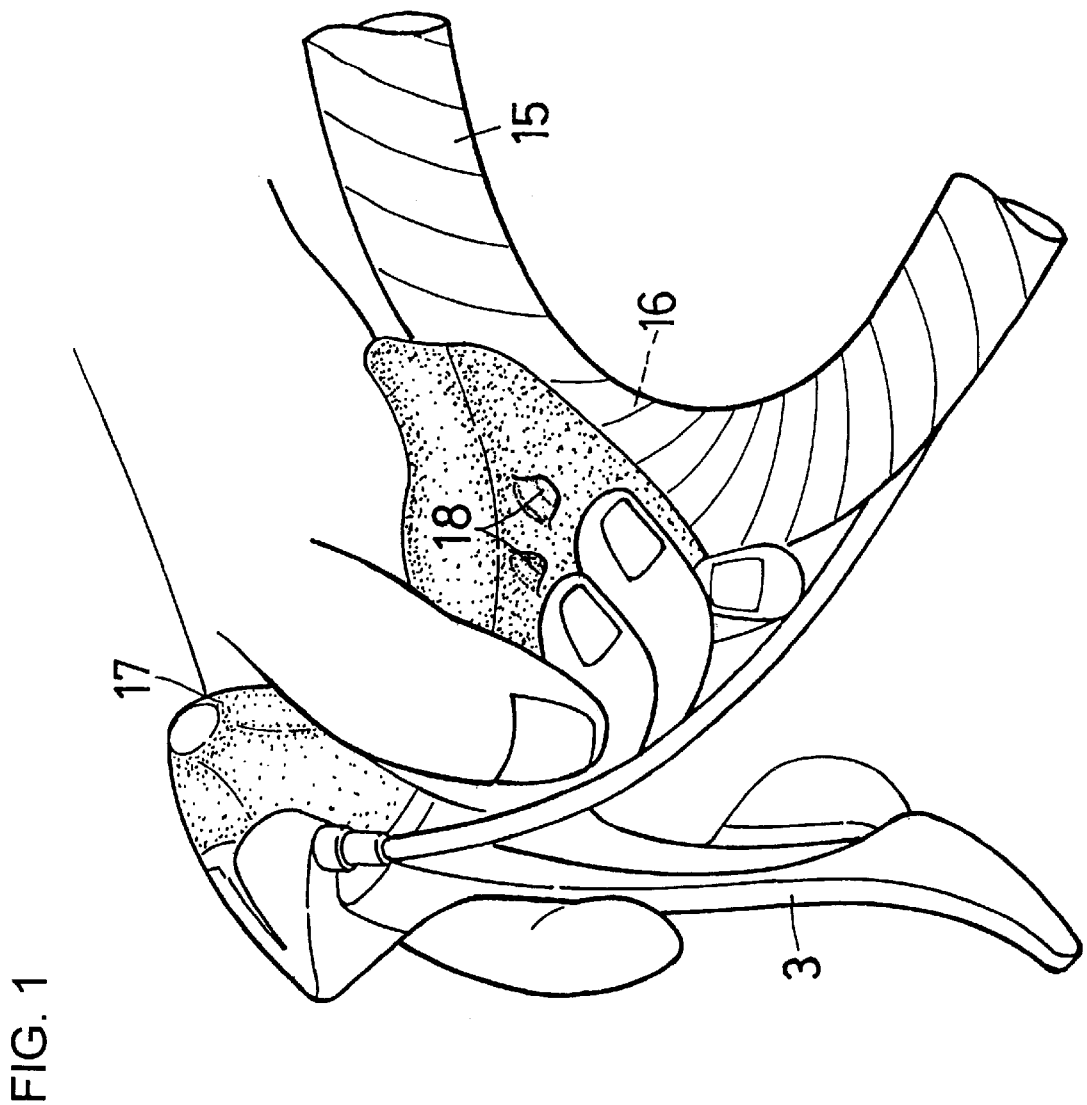
FIG. 1 is a side view of a particular embodiment of a combined brake lever and control switch assembly according to the present invention.
Figure 2:
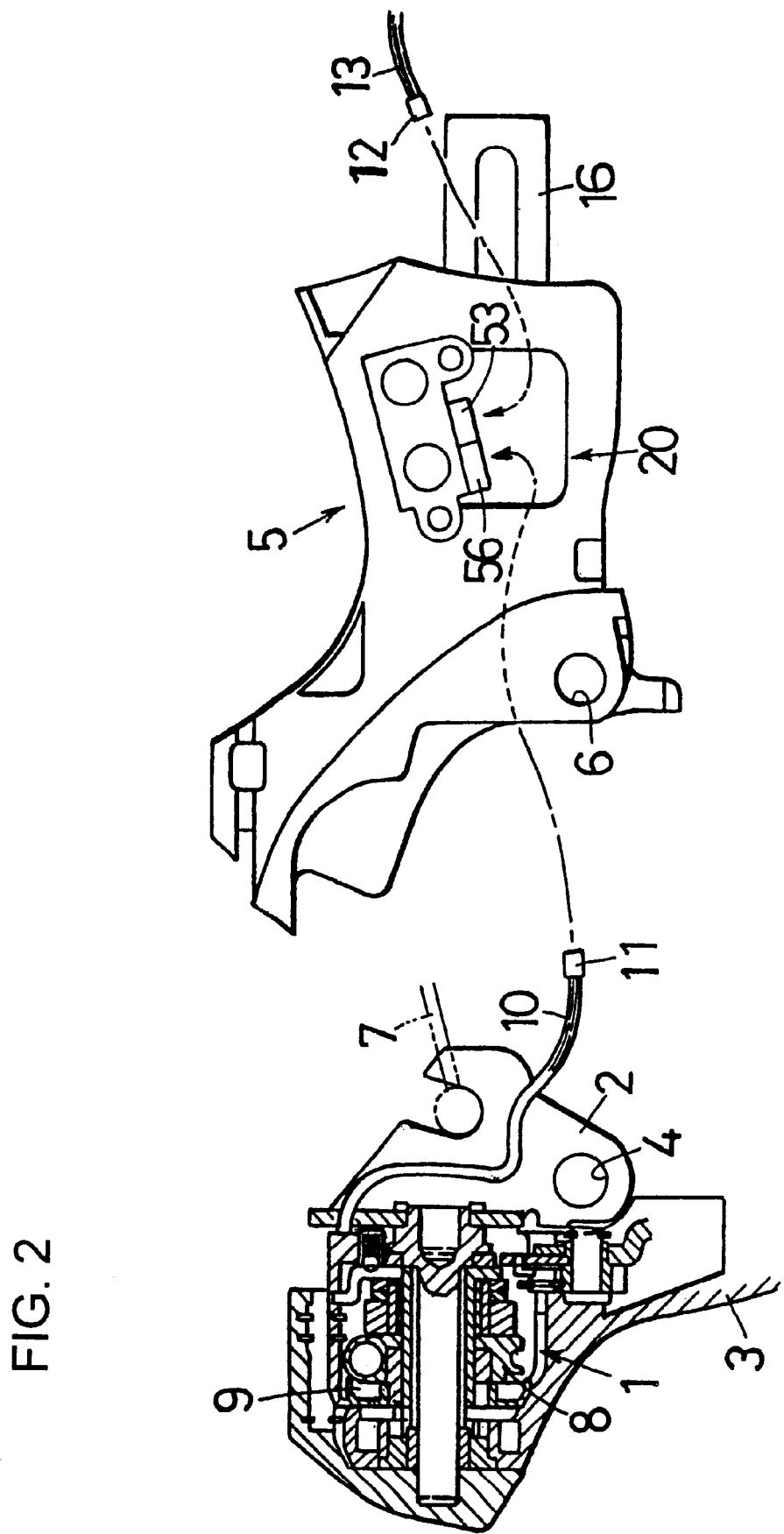
FIG. 2 is a partially exploded view of the brake lever and control switch assembly shown in FIG. 1.

FIG. 1 is a side view of a particular embodiment of a combined brake lever and control switch assembly according to the present invention, and FIG. 2 is a partially exploded view of the brake lever and control switch assembly shown in FIG. 1. As shown in those Figures, a combined brake and shifting device 1 is mounted on a pivoted body 2. In this embodiment, the combined braking and shifting device 1 is a device in which front braking and rear shifting can be accomplished with the same control lever 3.

The pivoted body 2 is swingably mounted on a bar bracket with the aid of spindles (not shown) that pass through the spindle hole 4 of the unit and the spindle hole 6 of the lever bracket 5. One end of a brake cable 7 is connected to the pivoted body 2, and one end of a derailleur wire (not shown) for actuating a derailleur such as a rear derailleur (not shown) is linked to a winding drum 8. To actuate the brake, the control lever 3 is operated to pivot the pivoted body 2 and to pull the brake cable 7. To operate the derailleur, the control lever 3 is rotated around a rotational axis orthogonal to the pivot axis, the winding drum 8 is rotatably driven, and the derailleur wire is pulled, thus shifting gears. Thus, brakes are applied by pivoting the pivoted body 2 with the aid of the control lever 3, and gears are shifted by rotating the winding drum 8 with the aid of the same control lever 3. The combined brake and shifting device has a known structure as disclosed in Japanese Laid-Open Patent Application 2-225191, for example. Thus, further details of the structure will be omitted.

The shifting device 1 is equipped with a position sensor 9 for sensing the position of the winding drum 8. The position sensor 9 electrically senses the angle of the winding drum 8 by means of contacts. The shifting position of the derailleur can therefore be sensed by sensing the angle of the winding drum 8. The position sensor 9 has a known structure, so further details of its construction also will be omitted.

One end of a flat cable 10 having a plurality of wires is connected to the contacts in position sensor 9. The flat cable 10 is passed through the lever bracket 5, and a male connector 11 disposed on the other end of cable 10 is connected to a female connector 56 (FIG. 5) on a printed circuit board 32, as will be described below. A male connector 12 on one end of a five-wire cable 13 is connected to a female connector 53 on the printed circuit board 32, and the other end of cable 13 is connected to a display (not shown).

Figure 3:
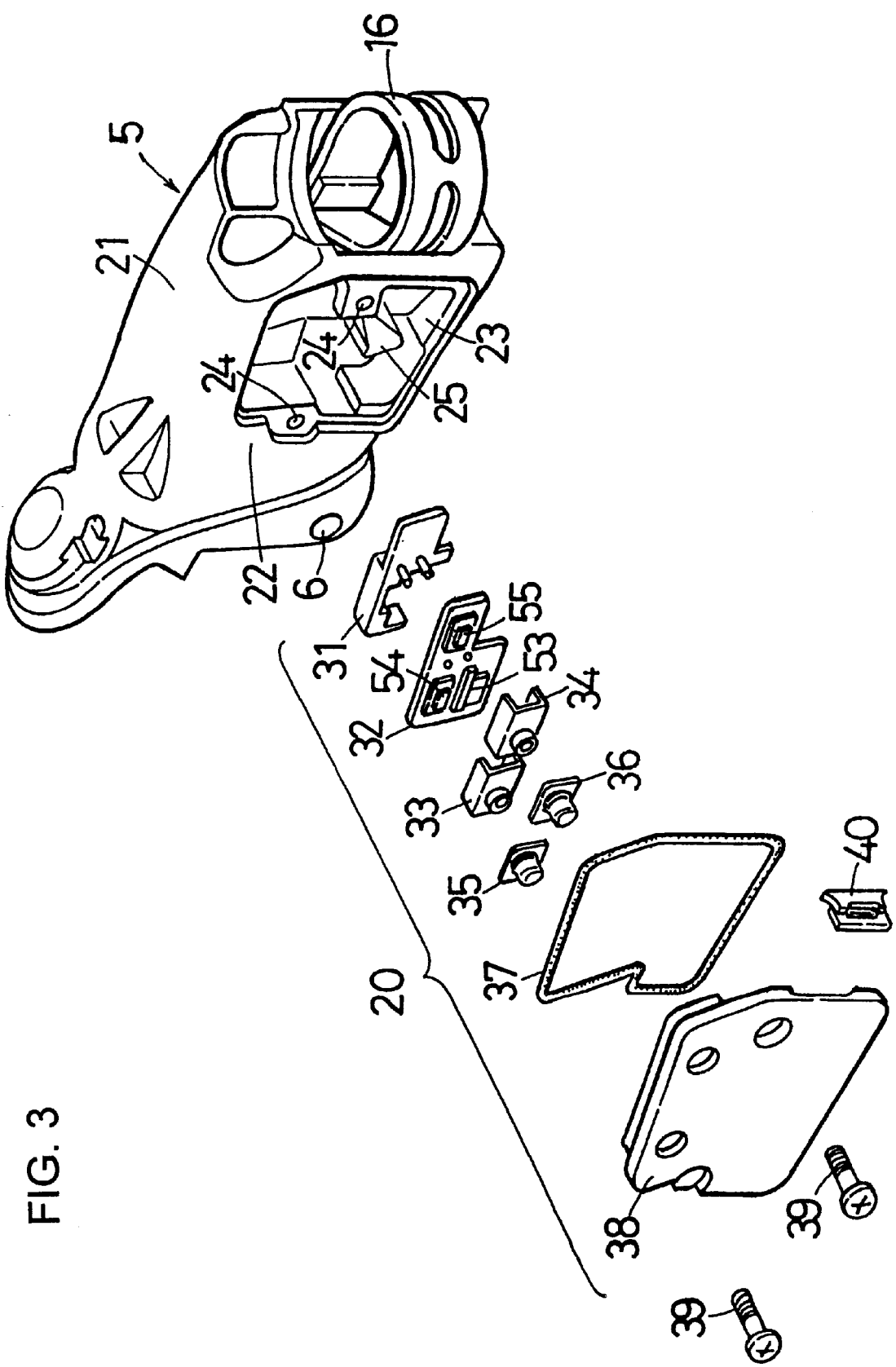
FIG. 3 is an exploded view of the control switch assembly shown in FIG. 2.

FIG. 3 is an exploded view of the control switch assembly shown in FIG. 2. The lever bracket 5, which is used for mounting the control lever 3, is fixed to a handlebar 15 (FIG. 1) with a fixing band 16. A concave switch unit 20 is mounted on the inside of the lever bracket 5, i.e., facing the basic center of the bicycle. Push buttons 35 and 36 of the switch unit 20 are secured at positions where they cannot be accidentally or easily pressed by the thumb when the rider squeezes the control lever 3 for braking.

The grip 21 in the center of the lever bracket 5 is roughly rectangular in cross section, and the angles thereof are rounded by chamfering. The surface 22 facing the center of the bicycle is provided with a switch unit mounting recess 23 for inserting and securing the unitized switch unit 20. Viewed from the front, the switch unit mounting recess 23, which is shaped as a deformed rectangle, is a bottomed hole for inserting and securing the switch unit 20. Two threaded holes 24 are provided in two locations in the switch unit mounting recess 23 for fixing a switch top cover 38 to lever bracket 5 via screws 39. In addition, a stopper surface 25 is formed in the central portion of the switch unit mounting recess 23 for contacting and positioning the printed circuit board 32 described below.

The switch unit 20 comprises a switch bottom case 31, the printed circuit board 32, push button guide members 33 and 34, push buttons 35 and 36, a seal 37, the switch top cover 38, the small screws 39, and other components. The switch bottom case 31 is used to fix and hold the printed circuit board 32. The printed circuit board 32 is used to install the push button guide members 33 and 34, connectors for connecting the cables, and so on. The switch top cover 38 and the switch bottom case 31 are fixed as a single unit by ultrasonic welding following assembly. The seal 37 seals the gap between the lever bracket 5 and the switch top cover 38.

The push button 35 is used to selectively operate an electrical circuit on printed circuit board 32 by depressing a start switch 54 fixedly mounted on the printed board 32. The start switch 54 is used to start and stop measurement of one or more of the displayed parameters. This function is well known, so a detailed description of it will be omitted. The push button guide member 33 is designed to guide the push button 35, thus allowing the start switch 54 to be operated in a secure manner. Similarly, the push button 36 is used to selectively operate an electrical circuit on printed circuit board by depressing a mode switch 55 fixedly mounted on the printed board 32. The mode switch 55 is used to select the display mode, that is, the type of parameter indicated on the display. Display modes include speed display mode, travel distance display mode for displaying the distance traveled, travel time display mode for displaying the time traveled, and so on. These functions also are well known, so a detailed description of them will be omitted. The push button guide member 34 is designed to guide the push button 36, thus allowing the mode switch 55 to be operated in a secure manner.

In this embodiment, the outside surface of the lever bracket 5 is covered around the entire periphery with a bracket cover 17 (FIG. 1) made of a synthetic resin., and a section of bracket cover 17 is provided with two push button protrusions 18. Protrusions 18 indicate the positions at which the push buttons 35 and 36 are installed in the underlying lever bracket 5. Pressing the push button protrusions 18 elastically deforms the bracket cover 17 and depresses the push buttons 35 and 36.

Also, in this embodiment, the two push button protrusions 18 differ from each other in height and shape. Using different heights, shapes, and other configuration attributes for the push button protrusions 18 makes it possible to determine by touch without looking which of the two protrusions is in contact with the thumb. This, in turn, helps to prevent switch malfunctions. The height and shape of the push buttons 35 and 36 may also be modified to correspond to those of the two push button protrusions 18.

Figure 4A:
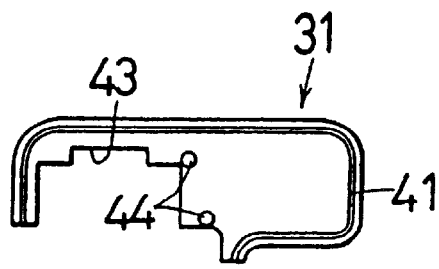
FIGS. 4(A) and 4(B) are front and side views, respectively, of the switch bottom case shown in FIG. 3.
Figure 4B:
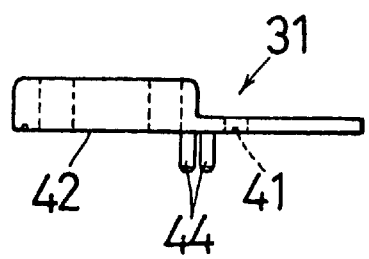

FIGS. 4(A) and 4(B) are front and side views, respectively, of the switch bottom case 31 shown in FIG. 3. The switch bottom case 31 is a roughly rectangular plate in which a groove 41 is formed around the outside of the front surface 42. The groove 41 is used to insert the protrusion 81 of the switch top cover 38 (FIG. 9) and to integrate the two parts by ultrasonic welding. A notch 43 is formed in the switch bottom case 31 for accommodating a male connector 56 (FIG. 5(B)) mounted on the printed circuit board 32. Two positioning pins 44 are formed on the front surface 42 of the switch bottom case 31 for positioning the printed board 32 in the switch bottom case 31.

Figure 5A:
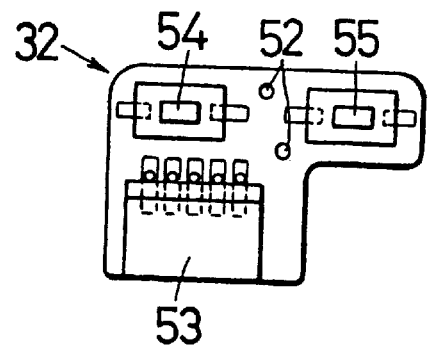
FIGS. 5(A) and 5(B) are front and rear views, respectively, of the printed circuit board shown in FIG. 3.
Figure 5B:
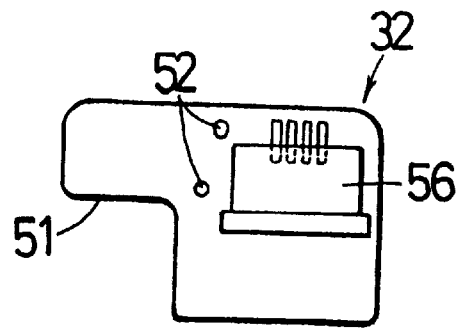

FIGS. 5(A) and 5(B) are front and rear views, respectively, of the printed circuit board 32 shown in FIG. 3. The printed circuit board 32 is a plate on whose surface an electric circuit is formed by a common method. The printed circuit board 32 has a roughly rectangular outline, and one of the corners is provided with a notch 51. Positioning holes 52 are formed at two locations in the central portion of the printed circuit board 32 for receiving the positioning pins 44 of the switch bottom case 31 to position the printed circuit board 32 in the switch bottom case 31.

Female connector 53 is fixedly soldered to the front surface of the printed circuit board 32 and is in electric contact with the wiring pattern formed from copper foil or another conductor on the printed circuit board 32. As noted above, female connector 53 connects to male connector 12 on cable 13. Similarly, female connector 56 is fixedly soldered to the rear surface of the printed circuit board 32 and is in electric contact with the wiring pattern formed on the printed circuit board 32. As noted above, female connector 56 connects to male connector 11 on cable 10 which, in turn, is connected to position sensor 9.

The start switch 54 and the mode switch 55 are conventional types of switches fixed to printed circuit boards by soldering. They are conventionally configured switches wherein pushing the top of each switch opens or closed a circuit in the printed circuit board 32. A spring built into each switch returns the switch to its initial operating position after it is operated.

Figure 6A:
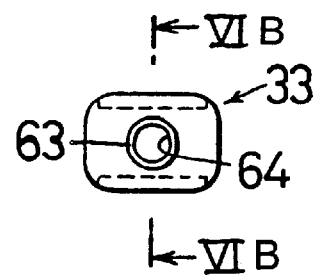
FIG. 6(A) is a front view of a push button guide member shown in FIG. 3.
Figure 6B:
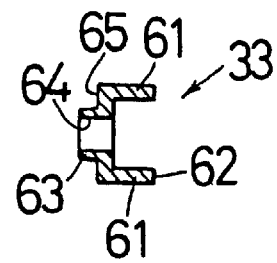
FIG. 6(B) is a view taken along line VIB—VIB in FIG. 6(A)

FIG. 6(A) is a front view of push button guide member 33 shown in FIG. 3, and FIG. 6(B) is a view taken along line VIB—VIB in FIG. 6(A). Push button guide member 34 has the same structure. The push button guide member 33 is positioned on the start switch 54. The push button guide member 33 is used to hold and guide the push button 35 and to allow the start switch 54 to operate reliably. The push button guide member 33 has; a rough C-shape in cross section.

The tips 62 of two legs 61 of push button guide member 33 contact the front surface of the printed circuit board 32, and the legs 61 straddle start switch 54. A cylindrical component 63 is formed in the center of the push button guide member 33, and a circular through-hole 64 is formed in the center of the cylindrical component 63. As will be described below, the front end face 65 of the push button guide member 33 is brought into contact with the back end face 74 (FIG. 7(B)) of the push button 35 during assembly.

Figure 7A:
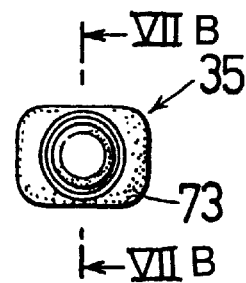
FIG. 7(A) is a front view of a push button shown in FIG. 3.
Figure 7B:
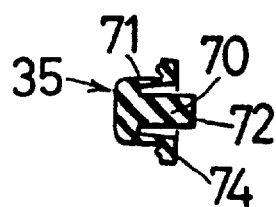
FIG. 7(B) is a view taken along line VIIB—VIIB in FIG. 7(A)
Figure 9A:
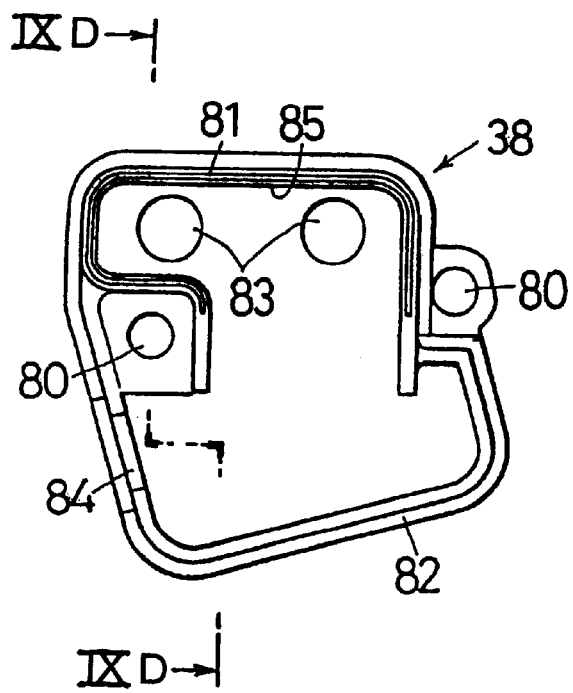
FIG. 9(A) is a front view of the switch front cover shown in FIG. 3.
Figure 9B:
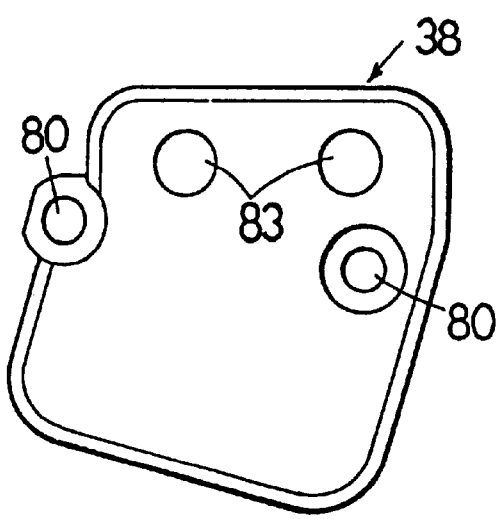
FIG. 9(B) is a rear view of the switch front cover shown in FIG. 3.
Figure 9C:
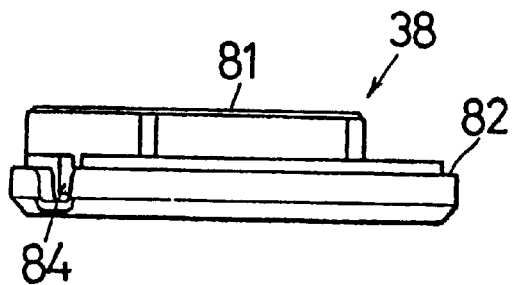
FIG. 9(C) is a side view of the switch front cover shown in FIG. 3.
Figure 9D:
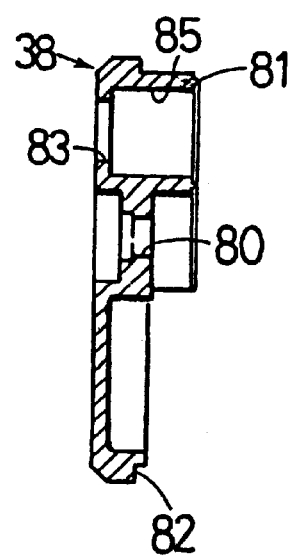
FIG. 9(D) is a view taken along line IXD—IXD in FIG. 9(A)

FIG. 7(A) is a front view of push button 35 shown in FIG. 3, and FIG. 7(B) is a view taken along line VIIB—VIIB in FIG. 7(A). Push button 36 is constructed the same way. The push button 35 is made of a synthetic resin elastomer and is deformed when subjected to a given minimum pressure. More specifically, push button 35 comprises a cylindrical actuator 70 and a skirt component 71 formed as one piece therewith. The skirt component 71 is a thin-walled member that is designed to deform the actuator 70 by bending to approximately 180 degrees in order to create a clicking sensation when the switch is depressed. Forming a skirt component 71 to create a clicking sensation is well known in the field of push button technology. A flange component 73 is formed integrally with the skirt component 71, and the flange component 73 is assembled such that its rear end face 74 is in contact with the front end face 65 of the push button guide member 33 (see FIG. 10). In this position, the tip surface 72 of the actuator 70 is in contact with the start switch 54. Thus, depressing push button 35 actuates the start switch 54.

FIG. 8(A) is a front view of the seal member 37 shown in FIG. 3, and FIG. 8(B) is a view taken along line VIIIB—VIIIB in FIG. 8(A). The seal member 37 may be formed from rubber, and it is designed to seal the gap between the switch unit 20 and the lever bracket 5 (i.e., the gap between the switch top cover 38 and the lever bracket 5). This seal is able to prevent water, contaminants, or the like from penetrating into the switch unit mounting recess 23 formed in the lever bracket 5.

FIGS. 9(A)–9(D) are diagrams depicting the switch top cover 38. The switch top cover 38 is integrated with the switch bottom case 31 by ultrasonic fusion, and it functions as the cover of the control switch assembly. The outline of switch top cover 38 roughly corresponds to the shape of the switch unit mounting recess 23 formed in the lever bracket 5. Small screw holes 80 for passing the small screws 39 are formed at two locations so that the switch top cover 38, and thereby the switch unit 20, may be fastened to lever bracket 5.

A protrusion 81 is monolithically formed to achieve joining with the groove 41 of the switch bottom case 31 (FIG. 4), and a stepped portion 82 for accommodating the seal member 37 is formed around the outer periphery of the cover. In addition, two push button holes 83 are formed in the upper portion of the unit. An enclosed component 85 for accommodating and housing push button guide members 33 and 34 is formed in such a way that it is open on one side and is connected to the push button holes 83. A notch 84 is formed on the edge of the switch top cover 38 for accommodating a cord seal 40 (FIG. 3) made of a synthetic resin elastomer for preventing water, contaminants, or the like from penetrating into the gap between the flat cable 13 and the switch top cover 38.

Figure 10:
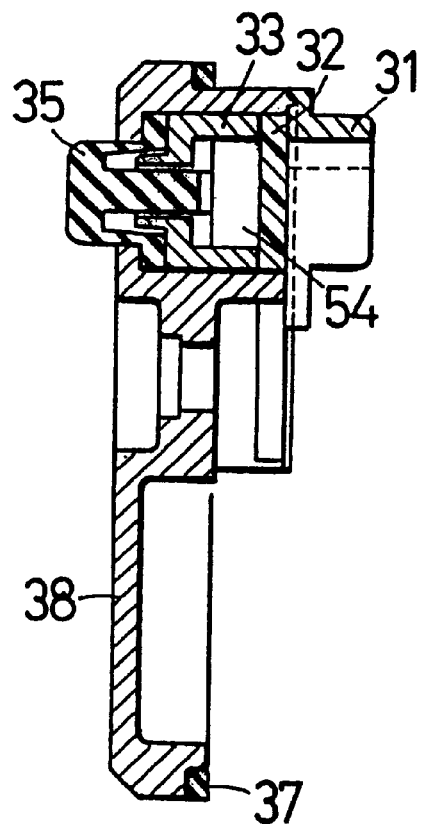
FIG. 10 is a cross sectional view of the switch unit of FIG. 3 in an assembled state.

FIG. 10 is a cross sectional view of the switch unit 20 of FIG. 3 in an assembled state. To assembly switch unit 20, the two positioning pins 44 of the switch bottom case 31 are inserted into the positioning holes 52 of the printed circuit board 32. The push buttons 35 and 36 and the push button guide members 33 and 34 are attached to the switch top cover 38, and the protrusion 81 of the switch top cover 38 is inserted into the groove 41 of the switch bottom cover. The joints of the protrusion 81 and groove 41 are then integrally fused by ultrasonic fusion. The seal member 37 is fitted into the stepped portion 82 of the switch top cover 38, the male connectors 11 and 12 of the flat cables 10 and 13 are connected to female connectors 56 and 53 of the printed circuit board 32, and the cord seal 40 is subsequently fitted into the notch 84. The switch top cover 38 is then secured by screwing the small screws 39 into the thread holes 24, to fix the switch unit 20 to the lever bracket 5. The lever bracket 5 is then covered with the bracket cover 17 and fixed to the handlebar 15 with fixing band 16.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. Thus, while the embodiment described above is such that the body of the switch unit 20 comprises a switch bottom case 31 and a switch top cover 38, the switch top cover 38 and the switch bottom case 31 may be initially integrated without being separated. Furthermore, although the described embodiment involved combining the brake lever and the shifting lever, the present invention is not limited to this option alone. The bicycle switch of the present invention may also be incorporated into other systems as long as a lever switch is provided. Although the above-described embodiment involved using a switch for controlling the bicycle computer, it is also possible to apply this approach to other applications requiring an electric switch such as a shifting switch for an automatic shifting device.

Figure 11:
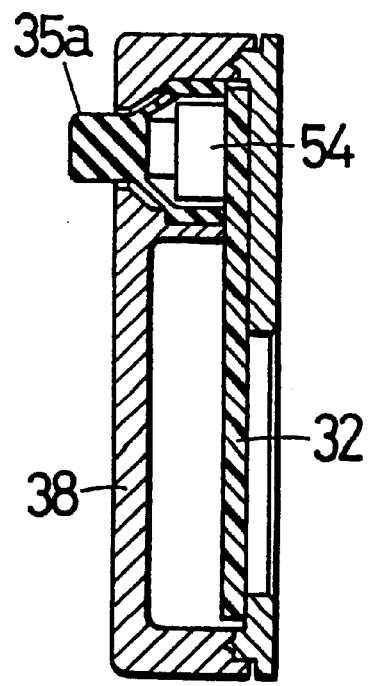
FIG. 11 is a cross sectional view of an alternative embodiment of a switch unit in an assembled state.

In the embodiment described above, the push buttons 35 and 36 are guided by the push button guide members 33 and 34. However, it is not always necessary to use the push button guide members 33 and 34. For example, in the device shown in FIG. 11 the leg of a push button 35a encircles the start switch 54, thus eliminating the need for push button guide members 33 and 34. Furthermore, the mode switch 55 and the start switch 54 on the printed circuit board 32 may be such that no electric circuits are necessary. In other words, contacts alone may be formed on the printed circuit board 32, and these contacts may come into contact directly with contacts provided to the push buttons 35 and 36.

Thus, the scope of the invention should not be limited by the specific structures disclosed. Instead, the true scope of the invention should be determined by the following claims.

What is claimed is:

1. A bicycle brake operating apparatus comprising:
   a brake member bracket for attachment to a handlebar, wherein the brake member bracket includes a first side wall, a second side wall and a partition between the first side wall and the second side wall defining a switch mounting recess; and
   a brake member movably attached to the brake member bracket between the first side wall and the second side wall.

2. The apparatus according to claim 1 further comprising an electrical switch disposed in the switch mounting recess.

3. The apparatus according to claim 2 wherein the electrical switch is detachably coupled to the brake member bracket.

4. The apparatus according to claim 1 wherein the brake member comprises a brake lever pivotably mounted to the brake member bracket.

5. The apparatus according to claim 1 wherein the switch mounting recess is disposed on a lateral side of the brake member bracket.

6. The apparatus according to claim 1 wherein the brake member comprises a brake lever that pivots around a pivot axis to operate a brake, and wherein the switch mounting recess is defined by a surface of the brake member bracket that is substantially perpendicular to the pivot axis.

7. A bicycle brake operating apparatus comprising:
   a brake member bracket for attachment to a handlebar, wherein the brake member bracket includes a concave inner surface defining a switch mounting recess;
   a switch disposed in the switch mounting recess;
   a brake member movably attached to the brake member bracket; and
   a flexible cover disposed on the brake member bracket and covering the electrical switch.

8. The apparatus according to claim 7 wherein the flexible cover is formed of a synthetic resin.

9. The apparatus according to claim 7 wherein the switch comprises an electrical switch.

10. A bicycle brake operating apparatus comprising:
    a brake member bracket for attachment to a handlebar, wherein the brake member bracket includes a concave inner surface defining a switch mounting recess;
    an electrical switch disposed in the switch mounting recess;
    a brake member movably attached to the brake member bracket;
    wherein the electrical switch comprises:
       a printed circuit board; and
       a first push button disposed on the printed circuit board for selectively operating an electrical circuit on the printed circuit board.

11. The apparatus according to claim 10 further comprising a second push button disposed on the printed circuit board for selectively operating the electrical circuit.

12. The apparatus according to claim 11 wherein the first and second push buttons project in a direction of an axis of rotation of the brake member.

13. The apparatus according to claim 12 further comprising a flexible cover disposed on the brake member bracket and covering the first and second push buttons.

14. The apparatus according to claim 13 wherein the flexible cover includes:
    a first protrusion disposed over the first push button; and
    a second protrusion disposed over the second push button.

15. The apparatus according to claim 14 wherein the first protrusion is shaped differently from the second protrusion.

16. The apparatus according to claim 11 wherein the first push button operates a mode switch for a bicycle computer, and wherein the second push button operates a start switch for the bicycle computer.

17. The apparatus according to claim 10 further comprising a switch case for housing the printed circuit board and the first push button.

18. The apparatus according to claim 17 further comprising a seal for sealing a junction between the switch case and the brake member bracket.

19. The apparatus according to claim 10 further comprising a flexible cover disposed on the brake member bracket and covering the first push button.

20. The apparatus according to claim 19 wherein the flexible cover includes a protrusion disposed over the first push button.

21. The apparatus according to claim 10 wherein the first push button projects in a direction of an axis of rotation of the brake member.

22. A bicycle brake operating apparatus comprising:
    a brake member bracket for attachment to a handlebar, wherein the brake member bracket includes a concave inner surface defining a switch mounting recess;
    an electrical switch disposed in the switch mounting recess;
    a brake member movably attached to the brake member bracket;
    wherein the brake member comprises a brake lever pivotably mounted to the brake member bracket;
    wherein the electrical switch comprises:
       a printed circuit board;
       a first push button disposed on the printed circuit board for selectively operating an electrical circuit on the printed circuit board;
       a second push button disposed on the printed circuit board for selectively operating the electrical circuit; and
    wherein the first and second push buttons project in a direction of an axis of rotation of the brake member.

23. The apparatus according to claim 22 further comprising a flexible cover disposed on the brake member bracket and covering the first and second push buttons.

24. The apparatus according to claim 23 wherein the flexible cover includes:
    a first protrusion disposed over the first push button; and
    a second protrusion disposed over the second push button.

25. The apparatus according to claim 24 wherein the first protrusion is shaped differently from the second protrusion.

26. A bicycle brake operating apparatus comprising:
    a brake member bracket for attachment to a handlebar, wherein the brake member bracket includes a first side wall, a second side wall and a surface, wherein the surface extends from one of the first side wall and the second side wall to a location between the first side wall and the second side wall and is exposed through an opening formed by the one of the first side wall and the second side wall; and
    a brake member movably attached to the brake member bracket between the first side wall and the second side wall.

27. The apparatus according to claim 26 further comprising a switch disposed in the opening.

28. The apparatus according to claim 27 wherein the switch comprises an electrical switch.

29. A bicycle brake operating apparatus comprising:
- a brake member bracket for attachment to a handlebar, wherein the brake member bracket includes a first side wall and a second side wall, wherein one of the first side wall and the second side wall includes an opening;
- a switch disposed in the opening and having a switch operating member that moves in response to a force perpendicular to the one of the first side wall and the second side wall; and
- a brake member movably attached to the brake member bracket.

30. The apparatus according to claim 29 wherein the switch operating member projects outwardly from the one of the first side wall and the second side wall.

31. The apparatus according to claim 30 wherein the switch originates at a location between the first side wall and the second side wall.

32. The apparatus according to claim 31 wherein the brake member comprises a brake lever pivotably connected between the first side wall and the second side wall.

33. A bicycle brake operating apparatus comprising:
- a brake member bracket for attachment to a handlebar, wherein the brake member bracket includes a first side wall and a second side wall;
- a switch originating at a location between the first side wall and the second side wall and having a switch operating member that is exposed at one of the first side wall and the second side wall, wherein the switch operating member moves in response to a force perpendicular to the one of the first side wall and the second side wall; and
- a brake member movably attached to the brake member bracket.

34. The apparatus according to claim 33 wherein the brake member comprises a brake lever pivotably connected between the first side wall and the second side wall.

* * * * *